United States Patent [19]

East

[11] Patent Number: 5,326,521
[45] Date of Patent: Jul. 5, 1994

[54] METHOD FOR PREPARING SILICONE MOLD TOOLING

[76] Inventor: Douglas A. East, 2498 Honey Springs Rd., Jamul, Calif. 91935

[21] Appl. No.: 67,846

[22] Filed: May 26, 1993

[51] Int. Cl.⁵ ............................................. B29C 33/40
[52] U.S. Cl. ................................... 264/225; 264/337; 264/DIG. 72; 249/134
[58] Field of Search ............... 264/220, 225, 227, 337, 264/DIG.72; 425/DIG. 44; 249/134; 427/426

[56] References Cited

U.S. PATENT DOCUMENTS

| | | | |
|---|---|---|---|
| 2,113,166 | 4/1938 | Zihser | 264/DIG. 72 |
| 3,440,086 | 4/1969 | Kerns | 264/DIG. 72 |
| 4,098,856 | 7/1978 | Rosenau | 264/225 |
| 4,239,564 | 12/1980 | Krumweide | 264/46.6 |
| 4,341,842 | 7/1982 | Lampe | 427/409 |
| 4,543,366 | 9/1985 | Smith | 427/426 |
| 4,794,026 | 12/1988 | Boultinghouse | 428/35.9 |
| 4,812,278 | 3/1989 | Natori et al. | 264/221 |
| 4,877,656 | 10/1989 | Baskin | 428/15 |
| 4,956,030 | 9/1990 | Baskin | 156/61 |
| 5,042,560 | 8/1991 | Ahlers | 264/221 |
| 5,085,942 | 2/1992 | Hong et al. | 428/492 |
| 5,108,667 | 4/1992 | Kamen et al. | 264/22 |
| 5,196,240 | 3/1993 | Stockwell | 427/389.9 |

FOREIGN PATENT DOCUMENTS

WO87/482  1/1987  PCT Int'l Appl. ............. 264/225

Primary Examiner—Jay H. Woo
Assistant Examiner—Robert B. Davis
Attorney, Agent, or Firm—Knobbe, Martens, Olson & Bear

[57] ABSTRACT

The present invention relates to spraying of high viscosity silicone molding compositions and to cured silicone molds or tools formed by that process that allow for near perfect transfer of detail from a surface to a molded object.

13 Claims, No Drawings

METHOD FOR PREPARING SILICONE MOLD TOOLING

BACKGROUND OF THE INVENTION

1. Field of the Invention

The present invention relates to spraying of high viscosity silicone molding compositions and to cured silicone molds or tools formed by that process.

2. Background of the Art

Molding is a time-honored technique in which shaped articles are copied. The molding composition is applied to the surface to be copied. It is then removed from the copied surface, retaining a negative copy of that surface. Then, when a hardenable material is applied to the negative copy, a copy of the original results.

A wide variety of rigid and flexible materials have been used in the prior art for making molds. These include plasters, cements, and natural and synthetic polymer materials. These polymer materials include latex rubber, silicone, polyurethane, and the like.

For molding of complicated shapes, one preferred technique is glove molding or skin molding.

In the process of glove molding or skin molding, a flexible polymer material is applied to the surface to be molded. After this flexible polymer material cures or hardens, a "backup tool" may be built (usually in several separable pieces) around the original surface having the polymer skin applied thereto. The backup tool is removed, the flexible polymer material (which is now a glove mold) is removed from the surface, and then the glove mold is assembled inside the backup tool. The backup tool gives support to the glove mold. Molding material is then applied to the negative surface of the glove mold, to reproduce the original.

In the glove molding process, silicone is a preferred glove mold-forming material. One of the reasons silicone is particularly appropriate is its ability to reproduce even the finest detail. Other favorable properties of appropriately-formulated silicone rubber include its tensile strength (which is relatively high), its high tear strength, and its excellent elongation properties. These properties permit silicone rubber to mold complex shapes seamlessly, and then after removal of the backup tooling, to be removed from the molded article by stretching.

Unfortunately, silicone rubber is relatively difficult to apply to surfaces of any size. Conventional silicone molding compositions typically comprise a two or three part formulation. Each of these parts must be mixed prior to using. Mixing by conventional means almost inevitably results in air entrainment into the silicone. Entrained air must be removed from the uncured molding composition prior to its application to the surface to be molded. Such air removal is generally accomplished by drawing a vacuum over the silicone. After a period of several minutes to an hour or more, the silicone is degassed and ready to apply. Next, the silicone is brushed or troweled onto the surface to be copied. This is a labor-intensive and time-consuming procedure. Large objects are particularly difficult to mold. Such articles, ten or more square meters in surface area, can require days to coat with silicone.

Spraying the silicone has heretofore been an unacceptable alternative. As a general rule, sprayable materials have relatively low viscosity. Unless the material is thin enough to flow, air entrained during the spraying process remains in the sprayed silicone and causes surface defects. Silicone rubber may be sprayed, for example, as disclosed in U.S. Pat. No. 4,812,278. However, such material is typically low-viscosity which will not form suitable molds of vertical surfaces. In U.S. Pat. No. 5,196,240, sprayable silicone with incorporated thixotropic agents is disclosed in connection with the production of seamless bodysuits. However, the problems of air entrainment and spraying of high viscosity silicones are not considered. Moreover, there is no disclosure in the reference concerning mold preparation or the use of multicomponent silicones.

Accordingly, there is a need for an improved technique for applying silicone rubber to surfaces to form molds of those surfaces.

SUMMARY OF THE INVENTION

In accordance with a first aspect of the present invention, there is provided a method for preparing silicone molding tooling of a shaped article, comprising the steps of providing a curable silicone resin composition having at least two parts that, upon mixing, cure to form a silicone rubber, mixing the parts of the silicone resin composition to form an uncured silicone rubber having a viscosity between about one million centipoise and about four million centipoise and having the ability to hang on a vertical surface in a layer of about 0.2 cm thickness without significant slumping, the mixing being accomplished in such a manner that entrainment of air in the uncured silicone rubber is avoided, spraying the uncured silicone rubber onto a surface to be molded in a single operation with the mixing step, the spraying being done in such a manner that entrainment of air in the uncured silicone rubber is avoided, wherein the layer is at least about 0.1 cm thick, and allowing the silicone rubber to cure on the surface to form a mold of the surface.

In a preferred embodiment, the cured silicone rubber has a Shore A durometer hardness of between about 10 and 50 measured according to ASTM D2240. In another preferred embodiment, the tensile strength of the cured silicone rubber is at least about 400 psi. In another preferred embodiment, the cured silicone rubber is capable of at least about 350% elongation, measured according to ASTM D412, Die C. In another preferred embodiment, the cured silicone rubber has a tear strength of at least 80 pounds per inch, measured according to ASTM 621, Die B. In another preferred embodiment, the cured silicone rubber has a shrinkage of less than about 0.5%, measured according to Mil. Spec. 23586E, paragraph 4.8.7.

In a preferred embodiment, the mixing and spraying steps is accomplished by pumping and metering the parts of the curable silicone resin composition into contact with each other in a manner that the parts are mixed, and in the same continuous operation spraying the resulting uncured silicone rubber through a spray gun onto the surface. In such embodiment, preferably, the spraying is accomplished by pushing the uncured silicone rubber through a spray nozzle by virtue of air pressure introduced into the nozzle combined with pumping pressure applied to the uncured silicone rubber.

In another preferred embodiment, the uncured silicone rubber is applied to the surface in a thickness between about 0.2 and about 1.0 cm.

In another aspect of the present invention, the method of the invention further comprises a step of applying backup tooling to the cured silicone rubber while on the surface.

In another preferred embodiment, the surface is a generally vertical surface. In still another preferred embodiment, the surface to which the silicone rubber is applied has a surface area of at least about 1 m². Or, in another embodiment, the surface to which the silicone rubber is applied has a surface area of about 10 m².

In accordance with another aspect of the present invention, there is provided a silicone rubber mold prepared in accordance with the method described above where the cured silicone rubber has a Shore A durometer hardness of between about 10 and 50 measured according to ASTM D2240, the tensile strength of the cured silicone rubber is at least about 400 psi, and the cured silicone rubber is capable of at least about 350% elongation, measured according to ASTM D412, Die C. In another preferred embodiment there is provided a silicone rubber mold prepared in accordance with the method described above where the surface to which the silicone rubber is applied has a surface area of about 10 m².

DETAILED DESCRIPTION OF THE INVENTION

The present invention requires the use of silicone rubber molding compositions having particular properties, and mixing and spraying equipment that permit simultaneous or sequential mixing and spraying of the silicone without entrainment of air or other gases into the silicone.

A primary concern of the present invention is that the silicone molding materials be capable of application without the entrainment of substantial quantities of air. It will be appreciated that an advantage to silicone molds is their ability to create near perfect detail transfer from a surface to be molded. Air bubbles within the silicone materials, however, detract from the ability of the silicone material to transfer such details.

Thus, the phenomenon of air entrainment has been a primary reason for the continued use of conventional application procedures of brushing and troweling of silicone materials onto surfaces. In various steps of silicone molding techniques, air bubbles can easily enter the silicone and are not easily removed. These steps include the mixing and application steps, no matter what mixing or application process was chosen. Therefore, the art generally would mix the silicone molding components, degas the mixture, and carefully apply the materials by hand to avoid gas bubble formation.

In the preferred embodiment of the present invention, the problem of air entrainment is solved through use of mixing and/or metering pump that allows dual or multi-component silicone containing components to be mixed and delivered to a spray system out of the presence of air. Therefore, the materials are mixed without the incorporation of bubbles. Also, the spray assembly is preferably configured to minimize the air entrapping potential of the stream of the silicone composition.

The compositions containing the silicone rubber used in the present invention also have a relatively high viscosity. Preferably, the viscosity of the compositions is at least about 800,000 centipoise, more preferably at least about 1,000,000 centipoise. Viscosity in the range of 1,000,000 to 4,000,000 centipoise is appropriate.

In addition to the viscosity characteristics of the compositions, the molding material in its uncured state should be a relatively low-slump material. That is, it should be able to hang on a vertical surface in a layer between about 0.2 and 1 cm in thickness without substantial slumping. More preferably, a layer of at least 0.3 cm or 0.4 cm, more preferably a layer at least 0.5 or 0.6 cm is formed without substantial slump.

Thus, the uncured materials consisting of a mixture of the various silicone resin components and that are deposited upon the surface to be molded is a thixotropic material.

In addition to the viscosity and low-slump characteristics of the uncured resin, the cured silicone rubber should have a durometer hardness of at least about 10 or 12 shore A; a tensile strength of at least about 300 or 400 psi, and elongation properties of at least 300 or 350 percent, together with a tear strength of at least about 80 to 150 ppi. These characteristics may be measured using standard testing procedures. Durometer hardness, for example, is measured using ASTM D 2440; elongation is measured using ASTM D 412, die C, and tear strength is measured using ASTM 621, die B. Viscosity measurement is advantageously conducted in accordance with U.S. Military Specification 23586E, paragraph 4.8.3. Shrinkage of the material is preferably no more than about 1%, more preferably no more than about 0.5%, and most preferably, no more than about 0.3%. Shrinkage of 0.1% is particularly preferred. Shrinkage may be measured using U.S. Military Specification 23586E, paragraph 4.8.7.

Thus, in accordance with one preferred embodiment of the invention, the silicone elastomer has the following properties:

| Property | Measurement |
| --- | --- |
| Viscosity | 1,000,000–4,000,000 centipoise |
| Work Time | 30 minutes–1 hour |
| Gel Time | 45 minutes–3 hours |
| Full Cure | 48–72 hours at 25° F. |
| Demold Time | 4–12 hours |
| Durometer | 12 Shore A–40 Shore A |
| Tensile Strength | 400–750 psi |
| Elongation | 350%–800% |
| Tear Strength | 80–150 ppi |
| Specific Gravity | 1.0–1.3 |

For use in the present invention, any of the commercial-available silicones meeting these criteria may be used. One specially formulated silicone falling within the scope of the present invention is available from AE Yale Enterprises, Inc., San Diego, Calif., under the trademark Polycon 650P (Spray Grade). That material is a two-component silicone elastomer having part A which contains a hydroxy terminated poly(dimethylsiloxane); modified silicone dioxide; dimethyl polysiloxane (methyl terminated), and sodium sulfate; and a part B containing dimethyl polysiloxane (methyl terminated), a silane derivative, an organotin carboxylate as a catalyst, and a minor percentage of modified silicone dioxide. In the commercially available material part A additionally contains a thickener (as opposed to being thickened merely by crosslinking of some ingredients).

Of course, the present invention is not limited to any one particular silicone composition; rather, any curable thixotropic silicone material having the above-identified properties may be used in the present invention. These includes two-component, three-component, and other multicomponent silicone formulations.

In using the present invention, the silicone composition is applied by means of equipment that simultaneously mixes the two or more components of the silicone elastomer to form an uncured silicone composition, and in the same step, spraying the silicone from a spray gun onto the surface to be molded. As appropriate, mold release agents may be applied to the surface prior to the application of the silicone.

In one preferred embodiment of the invention, metering pumps are used to combine the parts of the silicone elastomer together in a mixing chamber or conduit in the appropriate ratio. The combining of these materials is done is a gas-free environment inside the mixing equipment so that no air entrainment results. The mixing equipment preferably comprises a high-viscosity mix machine. Such a machine is capable of pumping and ratio-metering the silicone components. The part A and part B components of a two-part silicone (for example) pass through a static mix hose wherein they are properly blended and delivered to a hand-held spray gun. One suitable high-viscosity mix machine is sold by Graco, Inc., Minneapolis, Minn., under the trade designation HYDROMATE VARIABLE RATIO PROPORTIONER, SERIES 954-864.

The properly mixed and pumped uncured silicone resin is sprayed through a hand-held high-viscosity spray gun, such as Graco's 200A gun (Graco, Inc., Minneapolis, Minn.) on which is mounted a high-viscosity silicone spray head (available from A.E. Yale Enterprises, Inc., San Diego, Calif.).

Apparatus similar to that used in spraying plaster, stucco, and other cementatious type products can be used with similar effect.

It is important that the silicone is sprayed in such a manner that air entrainment does not result to any significant degree. Otherwise, the quality of the skin mold is decreased.

Depending on the silicone being sprayed and the thickness of the coating of silicone desired, a one or two coat application is used. The thickness of the uncured silicone on the tool surface (the surface being molded) is typically between about 0.2 and 2.0 cm, more preferably between about 0.4 and 1.0 cm.

In this manner, the material is simultaneously (or, in one continuous operation) pumped, metered, mixed, and sprayed with minimal air entrainment to the desired surface. One coat, two coats, or several coats may be used.

The relatively high viscosity of the compositions also surprisingly appears to assist in minimizing the entrapment of air. While not wishing to be bound by any particular theory, this appears to occur because as the compositions are forced from the nozzle of a sprayer, they exit more as globs, rather than as a mist or spray which would be the case for a lower viscosity material. A mist or spray as it travels from the nozzle to the surface of the material to be covered causes more of the composition to come into contact with the air and air is more likely to be trapped within the materials on the surface. In contrast, the more viscous material which travels in globs to the surface causes less of the composition to come into contact with the air and less air becomes entrapped.

However, it will be appreciated that should air become entrapped in these relatively viscous low slump compositions, bubbles will have a much higher probability of staying in place rather than floating out. In contrast, in thinner, or less viscous, compositions, bubbles can more readily float out. However, such thinner compositions will have the tendency to slump or not hang on the surface when applied in the desired thickness.

Therefore, careful attention must be paid to the selection and preparation of the compositions in order to obtain the desired the viscosity and slump characteristics of the compositions, while at the same time ensuring that the compositions do not entrain significant quantities of air.

After the silicone cures, a backup tool is built of rigid material. The backup tools is typically removed in several pieces, while the silicone "skin mold" is typically removed in a single piece. Because of the manner in which the silicone is applied, and because of the particular specified characteristics of the silicone material, silicone molds prepared in accordance with the present invention are unique in the art.

The process of the present invention greatly decreases tooling costs. Tooling costs may be reduced as much as 80% over conventional silicone tooling method. The prior art techniques of brushing on several coats of silicone or nonsilicone material may take several days. Weighing out batches, mixing multiple parts with conventional mixes, applying a vacuum on the mixed material before application, and hand-brushing or troweling the material onto a surface are all eliminated by the process of the present invention.

Instead, one simply sprays the silicone onto the surface with mixing and proportioning being simultaneously accomplished.

Moreover, unlike brushing or troweling, spraying silicone does not damage delicate surfaces, such as sculpted clay. Finally, no airborne particulates or overspray are created. Health hazards are minimal. The silicone molding compositions are substantially 100% solids. Thus, use of the present invention is environmentally friendly.

EXAMPLE I

Preparation of a Surface to be Molded

A surface is prepared for molding in accordance with the present invention as follows. Depending on surface characteristics, the surface is typically cleaned, either through brushing/dusting or other cleaning in order to remove any debris, dust, or buildup, unless such features are desired to be molded along with the remainder of the surface. Generally only a light dusting or brushing is necessary. Dust and loose debris removal is preferred, since, such materials would otherwise be picked up by the molding silicone compositions.

The type of cleaning necessary is generally dependant upon the type of surface. For example, where the surface is a rare art work or a work of historical significance, cleaning is kept to a minimum in order to not harm the work. In such a situation, generally the work will only be dusted or brushed to remove only loose debris or dust.

Where the work is of a more recent vintage or of less significance, any cleaning that is necessary to obtain the desired surface can be undertaken. However, again, all that is required is the removal of any loose debris or dust.

EXAMPLE II

Application of Mold Release Agent

A mold release agent can be advantageously applied to the surface to be molded if necessary. However, one of the advantages of the process of the present invention is that the silicone compositions used in the present invention are usually readily removable. Even surfaces with a plurality of pores (such as stone or other pitted materials) will typically not bind to the composition to such a degree to not allow removal. The cured silicone materials are resistant to tearing and also stretch. Therefore, even when they have filled a series of pores, the material will stretch and pull away from the material prior to tearing.

On antiques or valuable objects, one may desire not to use a mold release type agent, however, if one is used, may be a material that will not damage the surface, such such as talc. Usually, no mold release agent is necessary or desirable.

In other situations, any mold release agent can be used. However, it is preferable that the agent still be inert and not harm the surface or detract from the surface of the silicone mold.

EXAMPLE III

Preparation Spraying the Silicone Composition

Once the surface to be molded has been preferably cleaned as in Example I and optionally coated with a mold releasing agent as in Example II, the surface is ready for molding. Accordingly, a vessel containing the silicone resin such as part A of the Polycon 650P (Spray Grade) system from AE Yale Enterprises, Inc., San Diego, Calif. and a separate vessel containing the part B component of the Polycon 650P (Spray Grade) system are assembled. Separate hoses or lines are run from each vessel to a Graco Hydromate Variable Ratio Proportioner, Series 954-864 high-viscosity mix machine (Graco, Inc., Minneapolis, Minn.) that pumps and ratiometers the two components in a static mix hose wherein they are properly blended and delivered to a hand-held Graco 200A spray gun (Graco, Inc., Minneapolis, Minn.) on which is mounted a high-viscosity silicone spray head (available from AEL Enterprises, Inc., San Diego, Calif.).

The spray nozzle is adjusted to the appropriate setting by training the gun onto a non-mold surface and test spraying. Once that the proper setting is attained, spraying is commenced on the surface to be molded. A first and second coat is typically applied and a surface coating of approximately 0.4–0.5 cm is achieved. Ordinarily only a short delay is necessary between the first and second coat.

Thereafter, the composition is allowed to cure on the surface.

EXAMPLE IV

Preparation of the Backup Tooling

Backup tooling material is applied to the cured silicone material in a conventional manner. It may be constructed in segments or sections, depending upon the structure of the surface to which the silicone was applied. The construction is based on the convenience of removal and reconstruction to act as the backup for the cured silicone mold in order to provide the same three-dimensional structure as the original surface.

After the backup tooling has been constructed as above, it is taken apart and removed. Thereafter, it is reconstructed in the location where the mold will be used. The silicone mold, which has been removed from the surface, is then placed in the assembled backup tooling.

EXAMPLE V

Use of the Mold

Once the backup tooling has been reconstructed and the silicone mold is in place in the backup tooling, the mold is ready for use. The mold can be used in a conventional manner. The materials that can be molded therein should be inert with respect to the silicone rubber and should not be so heavy as to distort the backup tooling.

Preferably, the material to be molded is poured directly into the mold, sprayed onto the mold, or laid up on the mold, depending on the type of material in question and the configuration of the mold. If desired, a mold release agent may be first applied to the mold as discussed in Example II.

A variety of testing protocols have been disclosed and referred to herein in connection with the physical properties of the silicone materials for use in the present invention. These testing protocols are commonly known to those of skill in the art. Moreover, the procedures are published and available to the public. For example, the American Society of Testing Materials publishes the ASTM tests disclosed herein and Military Specifications are available from the U.S. Government.

Although the present invention has been described in the context of certain preferred embodiments, it is also the intent that equivalents shall be encompassed within the scope of the patent. Accordingly, the scope of the present invention should not be limited to the particular embodiments disclosed, but should instead be determined by reference to the claims that follow.

What is claimed is:

1. A method for preparing silicone molding tooling of a shaped article, comprising the steps of:
   providing a curable silicone resin composition having at least two parts that, upon mixing, cure to form a silicone rubber;
   mixing the parts of the silicone resin composition to form an uncured silicone rubber having a viscosity between about one million centipoise and about four million centipoise and having the ability to hang on a vertical surface in a layer of about 0.2 cm thickness without significant slumping, said mixing being accomplished in such a manner that entrainment of air in said uncured silicone rubber is avoided;
   spraying the uncured silicone rubber onto a surface to be molded in a single operation with said mixing step, said spraying being done in such a manner that entrainment of air in said uncured silicone rubber is avoided, wherein said layer is at least about 0.1 cm thick; and
   allowing said silicone rubber to cure on said surface to form a mold of said surface.

2. The method of claim 1, wherein said cured silicone rubber has a Shore A durometer hardness of between about 10 and 50 measured according to ASTM D2240.

3. The method of claim 2, wherein the tensile strength of said cured silicone rubber is at least about 400 psi.

4. The method of claim 3, wherein said cured silicone rubber is capable of at least about 350% elongation, measured according to ASTM D412, Die C.

5. The method of claim 4, wherein said cured silicone rubber has a tear strength of at least 80 pounds per inch, measured according to ASTM 621, Die B.

6. The method of claim 5, wherein said cured silicone rubber has a shrinkage of less than about 0.5%, measured according to Mil. Spec. 23586E, paragraph 4.8.7.

7. The method of claim 1, wherein said mixing and spraying steps is accomplished by pumping and metering said parts of said curable silicone resin composition into contact with each other in a manner that said parts are mixed, and in the same continuous operation spraying the resulting uncured silicone rubber through a spray gun onto said surface.

8. The method of claim 7, wherein said spraying is accomplished by pushing said uncured silicone rubber through a spray nozzle by virtue of air pressure introduced into said nozzle combined with pumping pressure applied to said uncured silicone rubber.

9. The method of claim 1, wherein said uncured silicone rubber is applied to said surface in a thickness between about 0.2 and about 1.0 cm.

10. The method of claim 1, further comprising the step of applying backup tooling to said cured silicone rubber while on said surface.

11. The method of claim 1, wherein said surface is a generally vertical surface.

12. The method of claim 1, wherein said surface to which said silicone rubber is applied has a surface area of at least about 1 m$^2$.

13. The method of claim 1, wherein said surface to which said silicone rubber is applied has a surface area of about 10 m$^2$.

* * * * *